United States Patent
Hosokawa et al.

(10) Patent No.: US 7,206,659 B2
(45) Date of Patent: Apr. 17, 2007

(54) NUMERICAL CONTROLLER

(75) Inventors: Masahiko Hosokawa, Yamanashi (JP); Masafumi Sano, Yamanashi (JP); Iwao Makino, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/345,390

(22) Filed: Feb. 2, 2006

(65) Prior Publication Data

US 2006/0173573 A1 Aug. 3, 2006

(30) Foreign Application Priority Data

Feb. 2, 2005 (JP) .............................. 2005/026708

(51) Int. Cl.
*G06F 19/00* (2006.01)

(52) U.S. Cl. ............... 700/193; 700/159; 700/186; 700/188

(58) Field of Classification Search .............. 700/44, 700/45, 47–50, 159, 160, 173–178, 186–188, 700/193; 706/12, 14–16, 23; 318/568.13, 318/568.22, 568.23, 569, 600, 632; 369/44.34
See application file for complete search history.

(56) References Cited

U.S. PATENT DOCUMENTS

| | | | | |
|---|---|---|---|---|
| 6,107,771 | A * | 8/2000 | Maeda .................. | 318/630 |
| 6,701,212 | B2 * | 3/2004 | Shiba et al. .............. | 700/193 |
| 6,903,527 | B2 | 6/2005 | Toyozawa et al. | |
| 7,084,596 | B2 * | 8/2006 | Iwashita et al. .......... | 318/638 |
| 7,085,620 | B2 * | 8/2006 | Maeda et al. ............. | 700/193 |
| 2003/0016607 | A1 * | 1/2003 | Cho et al. ............... | 369/47.42 |
| 2003/0053383 | A1 * | 3/2003 | Watanabe ............... | 369/44.34 |
| 2004/0150363 | A1 * | 8/2004 | Toyozawa et al. ....... | 318/568.13 |
| 2005/0085939 | A1 * | 4/2005 | Nakazato et al. ........ | 700/173 |
| 2005/0256605 | A1 * | 11/2005 | Maeda et al. ............ | 700/193 |
| 2006/0132078 | A1 * | 6/2006 | Iwashita et al. ......... | 318/568.18 |

FOREIGN PATENT DOCUMENTS

| | | |
|---|---|---|
| JP | 6-309021 | 11/1994 |
| JP | 7-104823 | 4/1995 |
| JP | 2004-227163 | 8/2004 |

* cited by examiner

*Primary Examiner*—M. N. Von Buhr
(74) *Attorney, Agent, or Firm*—Staas & Halsey LLP

(57) ABSTRACT

A numerical controller capable of obviating the waste of a workpiece by machining such that a position deviation by learning control is converged and automatically performing storage of correction data and actual machining. A tool and the workpiece are moved to noninterfering positions. In a learning control interval from the issuance of a learning control start command to the issuance of a learning control end command, the input and output are turned on so that the learning control is performed to input the position deviation and create and output the correction data. Processing in the learning control interval that involves the learning control is repeatedly executed a set number of times by idling operations. The obtained data is automatically stored in the numerical controller, the tool and the workpiece are moved to interfering positions, and the position deviation is corrected based on the correction data, whereby actual machining is performed. The correction data is automatically stored and the actual machining is performed using the correction data without wasting the workpiece, so that the cycle time can be shortened.

2 Claims, 3 Drawing Sheets

NUMERICAL CONTROLLER

BACKGROUND OF THE INVENTION

1. Field of the Invention

The present invention relates to a numerical controller for controlling a machine tool, and more particularly, to a numerical controller for executing a learning control function adopted when the same operation pattern is repeated for machining.

2. Description of Related Art

In performing machining or the like in response to repeated issuance of commands of the same operation pattern in a working machine, such as a machine tool that is controlled by a numerical controller, learning control is carried out as a known method to improve machining accuracy in which a control deviation is converged closed to zero. In this method, the same operation pattern is repeatedly ordered, and a memory is previously stored with correction data that is obtained based on a position deviation for each control period in the second latest operation pattern period. The position deviation is converged to zero by adding correction data of a control period corresponding to the second latest operation pattern period stored in the memory to the position deviation of each control period in the latest operation pattern period (e.g., JP 7-104823A and JP 6-309021A).

In another developed method (JP 2004-227163A), a learning control start command and a learning control end command are provided in advance in a machining program so that learning control is applicable to the case where a lot of identical components continue to be machined or the case where workpieces of the same machined shape are intermittently worked many times. The learning control is applied during a time interval from the issuance of the learning control start command to the issuance of the learning control end command. The correction data are created based on a position deviation obtained during that time interval and the position deviation is corrected.

The conventional learning control is repeatedly executed so as to obtain correction data such that the position deviation is converged to zero. After such correction data is obtained, the position deviation is corrected based on the correction data to ensure machining. For some machining, target machining accuracy can be obtained by repeatedly performing an idling operation (programmed machine operation without actual machining) several times to create the correction data, depending on the machined shape. Since the actual machining is performed as the correction data is created despite this, the position deviation is not converged close to zero in the machining before the correction data is obtained. Thus, there is a problem that the workpiece is machined with poor accuracy that entails wasteful machining.

Further, the correction data that involves the position deviation converged close to zero is used for machining of the same operation pattern after it is stored. Conventionally, such correction data is stored by manual operation after it is obtained by learning control. In many cases, this manual operation for storage is liable to be missed and requires repetition of the learning control.

There is another problem. After the acquisition of the correction data that involves the position deviation converged close to zero is confirmed by the learning control, it is necessary to correct the position deviation based on the correction data for machining and machine the workpiece by rerunning the program. Thus, the machining cycle time is lengthened correspondingly.

SUMMARY OF THE INVENTION

The present invention provides a numerical controller having a learning control function capable of improving the above problems of the prior art.

A numerical controller of the present invention controls a servomotor for driving a machine according to a machining program, and has a function of learning control to obtain correction data based on position deviations during repetition of execution of the same operation pattern and correct position deviations in execution of the same operation pattern based on the obtained correction data. The numerical controller comprises: means for moving a tool relative to a workpiece from a position commanded by the machining program to a shifted position where the tool and the workpiece do not interfere with each other; means for obtaining the correction data by automatically repeating the same operation pattern at the shifted position a set number of times, or until the position deviation is reduced to a set value or less; means for automatically storing the obtained correction data; and means for moving the tool relative to the workpiece from the shifted position to the commanded position, and controlling the servomotor to perform machining by correcting the position deviations in execution of the same operation pattern based on the obtained correction data. Thus, the workpiece is not wastefully consumed, the obtained correction data are securely stored and saved, and the machining cycle time is shortened.

The correction data may be obtained and stored, and the machining may be performed by correcting the position deviations in execution of the same operation pattern based on the correction data, in one execution of the machining program.

In a learning control interval such that the same operation pattern is executed, the same operation pattern is repeatedly executed a plurality of times or so that the position deviation is reduced to a specified value or less by automatic idling operations that involve no machining. Further, learning control is executed to create and automatically store and save the correction data, and thereafter, the position deviation is corrected based on the correction data as actual machining is performed. Thus, the created correction data can be securely stored and saved without wasting the workpiece and the actual machining can be automatically started, so that the machining cycle time can be shortened.

DETAILED DESCRIPTION

Figure 1:
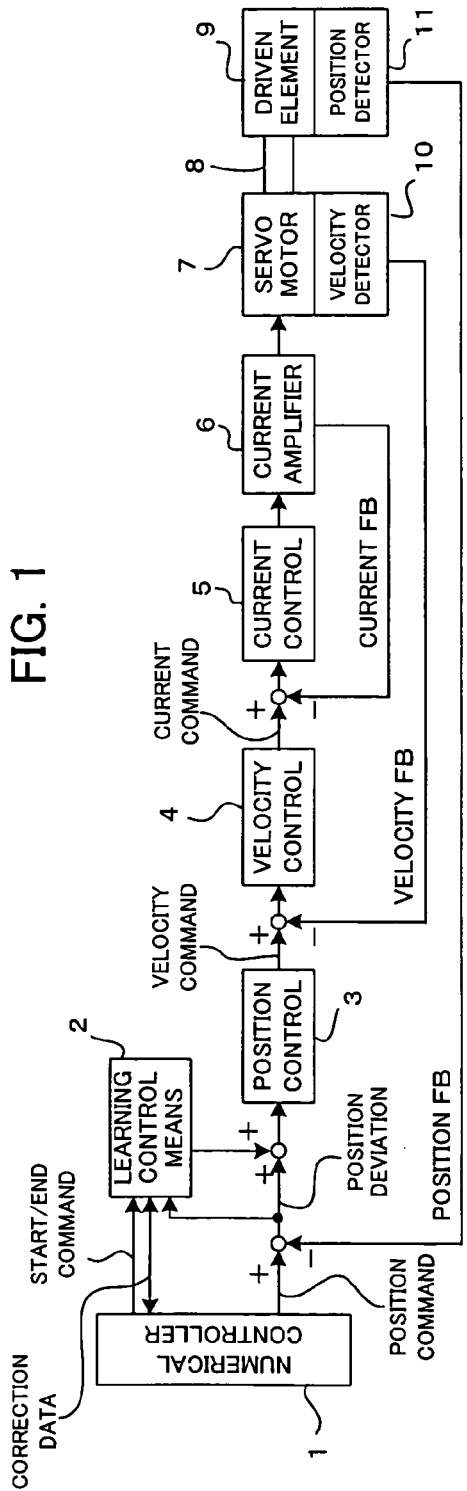
FIG. 1 is a schematic block diagram showing servo control to which is applied learning control performed by a numerical controller according to a first embodiment of the present invention.

FIG. 1 is a schematic block diagram showing servo control to which is applied learning control performed by a numerical controller according to a first embodiment of the present invention. Based on a machining program, a numerical controller 1 outputs a position command to a servo control section of a servomotor 7 for drivingly controlling a driven element 9. In the servo control section, the position, velocity, and current are feedback-controlled for each given control period in response to the position command, whereby the servomotor 7 is driven to drivingly control the driven element 9.

More specifically, a present position fed back from a position detector 11 for detecting the moved position of the driven element 9 is subtracted from the position command outputted from the numerical controller 1, whereby a position deviation is obtained. In a position control section 3, a velocity command is obtained by multiplying the position deviation by a position loop gain. Further, a velocity deviation is obtained by subtracting an actual velocity fed back from a velocity detector 10, which is attached to the servomotor 7 and serves to detect its velocity, from the velocity command. A current command (torque command) is obtained by performing velocity loop control, such as PI (proportional-integral) control, in a velocity control section 4. Further, a current deviation is obtained by subtracting a drive current fed back from a current amplifier 6 from the current command, and current loop control is performed in a current control section 5. The servomotor 7 is drivingly controlled by the current amplifier 6, while the driven element 9 is driven by a transmission mechanism 8.

If a learning control start command is read from the machining program, the numerical controller 1 starts learning control. Correction data is added to the position deviation, position loop control is performed based on the corrected position command in the position control section 3, and correction data is created and stored in accordance with the position deviation. This learning control process is executed until a learning control end command is read.

Figure 2:
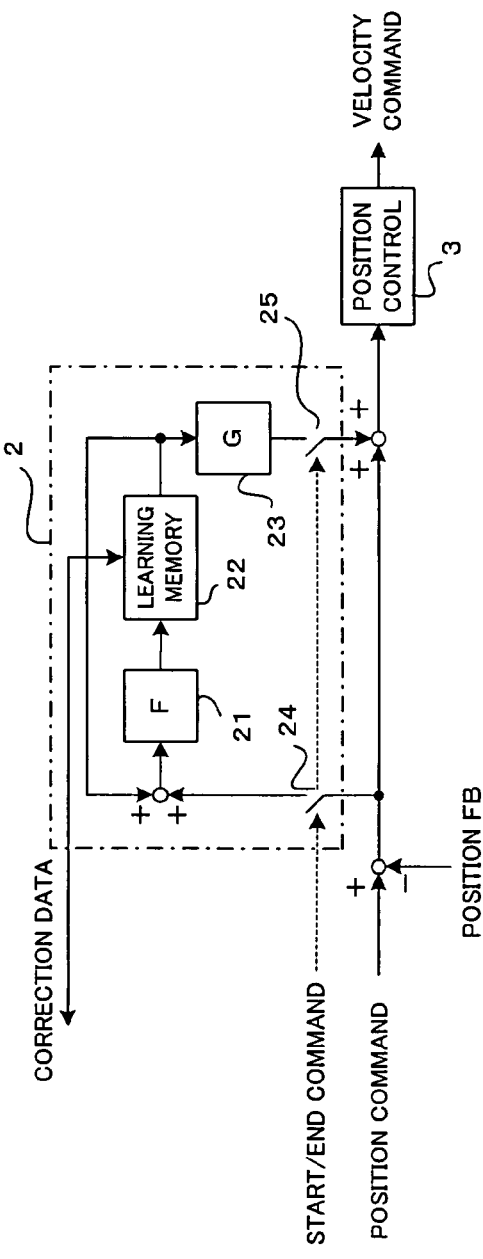
FIG. 2.is a detailed block diagram showing learning control means.

FIG. 2 is a detailed block diagram of learning control means 2. This learning control means 2 comprises a band limiting filter 21, learning memory means 22 for storing the correction data, and a dynamic characteristic compensation element 23 for compensating for a phase delay of a controlled object and gain reduction. Further, the learning control means 2 comprises switches 24 and 25 for starting and stopping the learning control. The learning memory means 22 is provided with memories as many as control periods in which position/velocity loop control is performed for the same operation command pattern to be learned. The number of the given control periods may be set in response to the learning control start command. If the given control period number is not set, a large enough value may be set for a first cycle so that the given control period number can be settled during a time interval (count number of given control periods) between start and end commands for the first cycle. When the correction data is transferred to or from the numerical controller 1, a host control device, moreover, the given control periods can be transferred simultaneously. If an interval for the same operation command pattern and a position/velocity loop control period are L and T, respectively, for example, the learning memory means 22 is provided with an L/T number of memories.

When the learning control start command is outputted from the numerical controller 1, the switches 24 and 25 are closed, whereupon the learning control means 2 fetches the position deviation for each given period in which the position/velocity loop control is performed. The oldest correction data stored in the learning memory means 22 is added to this position deviation, and the resulting data is processed in the band limiting filter 21 and stored as correction data in the learning memory means 22. Further, the oldest correction data fetched from the learning memory means 22 is subjected to compensation for the phase delay of the controlled object and the gain reduction by the dynamic characteristic compensation element 23. The resulting correction data is added to the position deviation through the switch 25 and inputted to the position control section 3. The position deviation corrected by the addition of the correction data is multiplied by the position loop gain, whereby the velocity command is obtained. This processing operation is executed until the learning control end command is outputted from the numerical controller 1 to turn the switches 24 and 25 off after ordering the same command pattern is finished. Thereupon, the learning memory means 22 is stored with the correction data for each position/velocity control period in the same command pattern interval.

In the same command pattern interval, the correction data is added to the position deviation so that the position deviation is converged close to zero.

The learning control is performed in this manner. If the learning memory means 22 is provided with an L/T number of memories, where L and T are the same operation command pattern interval and the position/velocity loop control period, respectively, therefore, a first learning memory is loaded with correction data for a first control period after the start of the learning control, a second learning memory with correction data for a second control period, and an n-th learning memory with correction data for an n-th control period. When the next learning control interval for the same command pattern is entered, the correction data is loaded into the learning memory corresponding to the control period concerned in like manner, and the previously stored correction data is read out and used to correct the position deviation. Thus, the correction data stored in the first learning memory is added to the position deviation in the first control period after the start of the learning control, the correction data stored in the second learning memory is read out and added to the position deviation in the second control period, and the correction data stored in the n-th learning memory is added to the position deviation in the n-th control period.

The learning control by the learning control means 2 and the motor control described above can be carried out according to the conventional methods for learning control and motor control. According to the present invention, an idling operation without involving machining is repeatedly executed in a learning control interval, and correction data such that the position deviation is converged to substantially zero by the learning control is obtained and stored and used to correct the position deviations as actual machining is performed. The cycle time of the machining can be shortened by automatically performing this operation.

Figure 3:
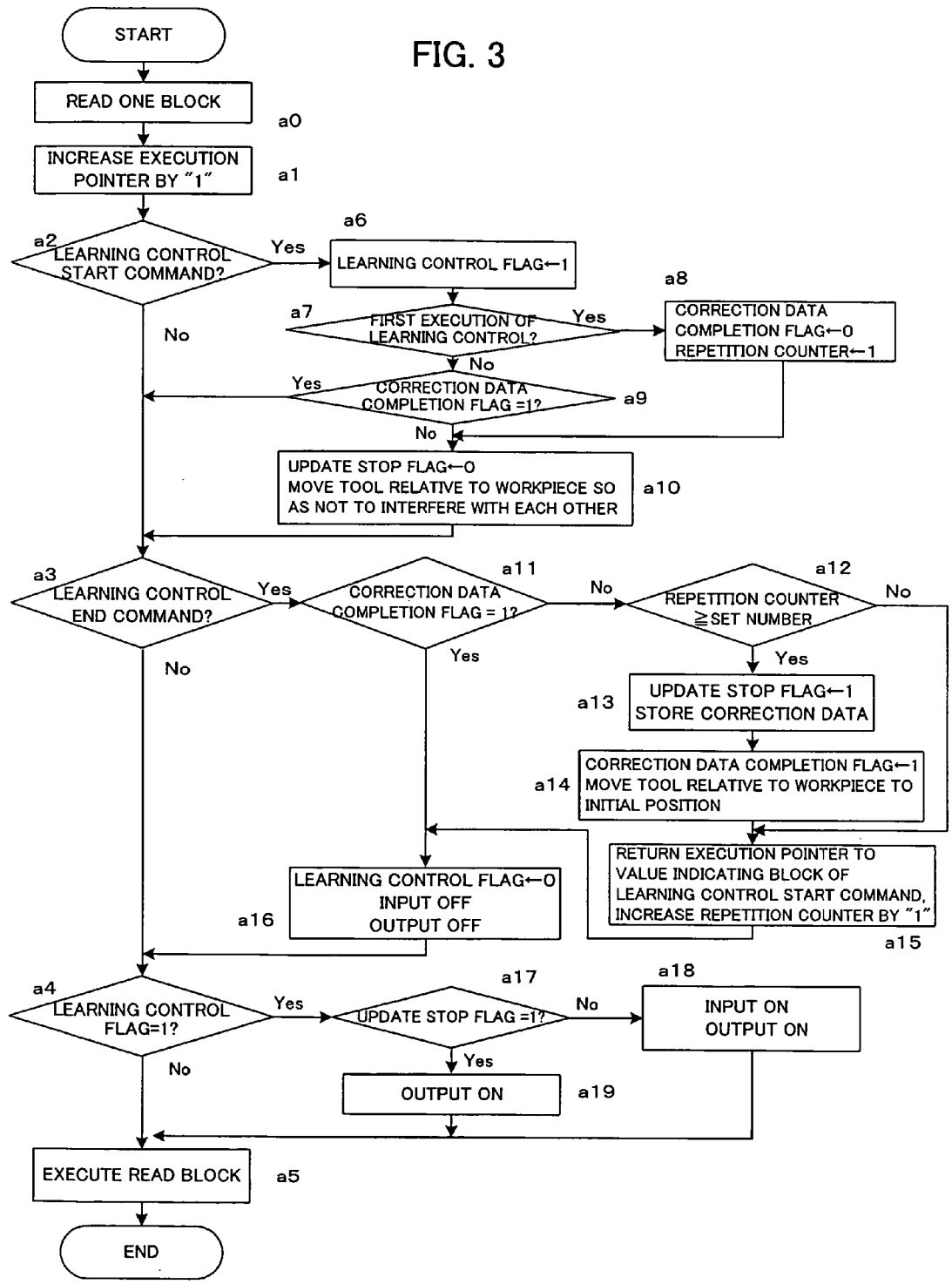
FIG. 3 is a flowchart showing learning control management processing executed by the numerical controller according to the first embodiment of the invention.
Figure 4:
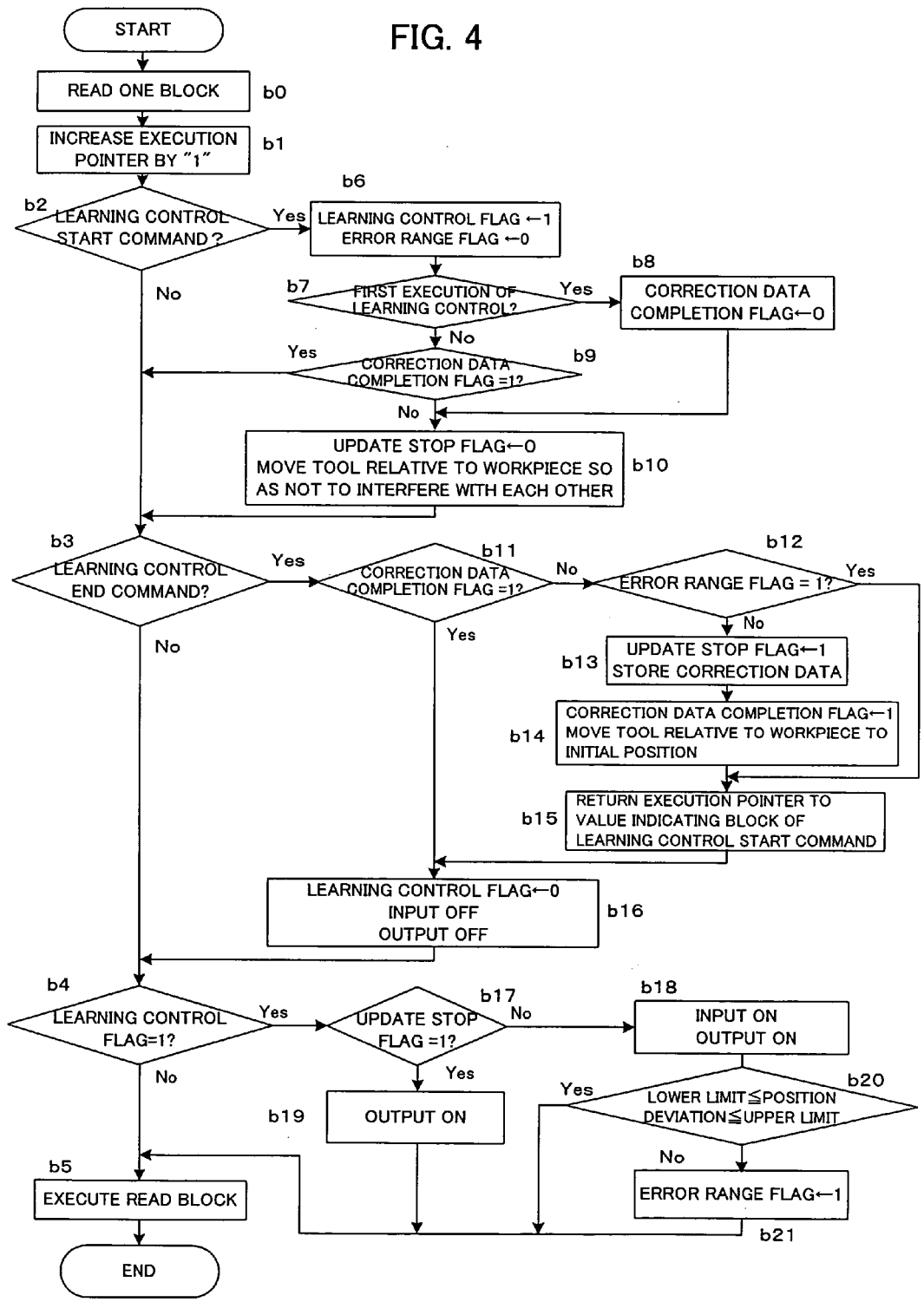
FIG. 4 is a flowchart showing learning control management processing executed by a numerical controller according to a second embodiment of the invention.

The numerical controller 1 is constructed substantially in the same manner as a conventional one, and its novelty lies in that it is provided with software for managing learning control, as shown in FIGS. 3 to 5. Since the hardware configuration of the numerical controller 1 is the same as that of the conventional one, a description thereof is omitted.

FIG. 3 is a flowchart showing learning control management processing according to the first embodiment of the invention. According to this embodiment, the convergence of the position deviation close to zero is determined by the number of repetitions of the learning control. To attain this, the number of repetitions of the learning control is set in advance.

A processor of the numerical controller 1 performs the processing shown in FIG. 3 for each given period. One block of the machining program indicated by an execution pointer is read out and the execution pointer is increased by "1" (Steps a0 and a1). The execution pointer is initially set at 0 by initialization. Then, it is determined whether the read block contains a learning control start command (Step a2), whether the read block contains a learning control end command (Step a3), and whether a learning control flag is not set at 1 (Step a4). If neither the learning control start command nor the learning control end command is issued with the learning control flag not at 1, the read block is executed. If a move command is issued, in this case, processing is performed such that the move command is outputted to the position control section 3 of a motor control unit (Step a5).

Thereafter, the above-described processing is executed. If it is concluded that the block read in Step a2 contains the learning control start command, the learning control flag that is indicative of the execution of the learning control is set to 1 (Step a6), and it is determined whether or not the learning control start command is read for the first time (Step a7). This determination is made based on whether or not the learning control means 2 is loaded with correction data. If the learning control means 2 is not loaded with any correction data, the learning control start command is concluded to be read for the first time, and a correction data completion flag is set to 0. Thereupon, a repetition counter that is provided for repeating one operation pattern from the learning control start command to the learning control end command is set to 1 (Step a8). Then, the procedure proceeds to Step a10 in which an update stop flag is set to 0, and a tool or a workpiece is shifted for a predetermined amount in a predetermined direction to a position such that they do not interfere with each other.

Subsequently, it is determined whether or not the read block is the learning control end command. Since the block is not the learning control end command in this case, it is then determined whether or not the learning control flag is 1 (Step a4). Since the learning control flag is set to 1 in Step a6, the procedure proceeds to Step a17, in which it is determined whether or not the update stop flag is 1. Since the update stop flag is set to 0 in Step a10, a command for input-on and output-on is outputted to the learning control means 2, and the switches 24 and 25 shown in FIG. 2 are turned on to start the learning control (Step a18). Then, the procedure proceeds to Step a5, in which it is determined whether or not the read block contains any other command. If there is another command, it is executed.

From the next period on, the procedure proceeds to Steps a0, a1, a2, a3 and a4. Since the learning control flag and the update stop flag are 1 and 0, respectively, the processes of Steps a4, a17, a18 and a5 are executed in the order named, and the learning control is also executed. Since the tool and the workpiece are shifted to the position where they do not interfere with each other in Step a10, however, an idling operation is performed without involving machining.

Thereafter, this processing is executed for each period. If a block in which the learning control end command is read, the procedure proceeds from Step a3 to Step a11, in which it is determined whether or not the correction data completion flag is 1. Since the correction data completion flag is initially set to 0, the procedure proceeds to Step a12, in which it is determined whether or not value of the repetition counter reaches a set number or higher. If the set number of times is not reached, the execution pointer is returned to a value indicating the block of the learning control start command and 1 is added to the repetition counter (Step a15). The learning control flag is set to 0 and a command for input-off and output-off is outputted to the learning control means 2 to stop the learning control (Step a16), whereupon the procedure proceeds to Step a4. Since it is concluded in Step a4 that the learning control flag is 0, the command for the read block is executed (Step a5), whereupon the processing for the period concerned terminates.

In the next period, the execution pointer indicates the block that contains the learning control start command, so that this block is read. Thereupon, the procedure proceeds from Steps a1 and a2 to Step a6, in which the learning control flag is set to 1. It is determined whether or not the learning control start command is a first command in the aforesaid manner (Step s7). Since the start command is not a first command in this case, it is determined whether or not the correction data completion flag is at 1 (Step a9). Since the correction data completion flag is initially set to 0, the procedure proceeds to Step a10, in which the update stop flag is set to 0 in the aforesaid manner, the tool and the workpiece are shifted to the position where they do not interfere with each other, and the processes of Steps a3 and a4 are performed. Since the learning control flag and the update stop flag are 1 and 0, respectively, the processes of Steps a17, a18 and a5 are performed in the order named and the learning control is executed.

When the learning control is executed in this manner and if it is concluded in Step a3 that the learning control end command is issued, the processes of Steps a11 and a 12 are performed, as mentioned before. If the set number is not reached by the value of the repetition counter, the processes of Steps a15, a16, a4 and a5 are performed.

Thereafter, the execution pointer is returned to the block for the learning control start command every time the learning control end command is read until the set number is reached by the repetition counter value. Then, the learning control is repeatedly executed to create correction data in an interval (one operation pattern) from the issuance of the learning control start command to the issuance of the learning control end command.

If it is concluded in Step a12 that the set number is reached by the repetition counter value, the update stop flag is set to 1, and the correction data to be stored in the learning memory means 22 of the learning control means is read and loaded into a memory in the numerical controller 1 to be saved therein (Step a13). Further, the correction data completion flag is set to 1, and the tool and the workpiece having so far been shifted to the noninterfering positions are restored. Thus, the tool and the workpiece are moved to the initially programmed positions in which they interfere with each other, and the idling operation is stopped (Step a14). Then, the execution pointer is returned to the value indicating the block of the learning control start command and 1 is added to the repetition counter (Step a15). The learning control flag is set to 0 and the command for input-off and output-off is outputted to stop the learning control (Step a16), whereupon the procedure proceeds to Step a4.

In the next period, the block that contains the learning control start command and is indicated by the execution pointer is read, so that the procedure proceeds from Step a2 to Step a6, in which the learning control flag is set to 1. Then, it is determined whether or not the learning control start command is read for the first time (or whether or not correction data is stored in the learning memory means)

(Step a7). Since the correction data is stored in the learning memory means, that is, the learning control start command is not read for the first time, it is then determined whether or not the correction data completion flag is set at 1 (Step a9). Since the correction data completion flag is set to 1 in Step a14, the procedure proceeds from Step a9 to Step a3. Since it is concluded in Step a4 that the learning control flag is set at 1, the procedure proceeds to Step a17, in which it is determined whether or not the update stop flag is set at 1. Since the update stop flag is already set at 1 in Step a13, a command for output-on is issued, and the input is kept off (Step a19), whereupon the procedure proceeds to Step a5. Since the input and output are off and on, respectively, the switches 24 and 25 of FIG. 2 are off and on, respectively. Thus, only correction of the position deviation by the correction data is performed, but the correction data is not updated.

Thereafter, the processes of Step a0 to a4, Step a17, a19 and a5 are executed for each period until the learning control end command is read. If the learning control end command is read, the procedure proceeds from Step a3 to Step a11. Since the correction data completion flag is set at 1, the procedure proceeds from Step a11 to a16, in which the learning control flag is set to 0, the command for input-off and output-off is outputted to stop the correction of the position deviation by the correction data. Thus, in the learning control interval from the learning control start command to the learning control end command, the output is on, so that the position deviation is corrected based on the correction data stored in the learning memory means of the learning control means 2, and the position, velocity, and current loop processing is performed. Since the learning control flag is 0 in any other intervals than the learning control interval, machining is executed without the correction of the position deviation.

In the interval from the issuance of the learning control start command to the issuance of the learning control end command, as described above, the machining is not actually performed, and the learning control is repeatedly executed for the set number of times in idling operations to create correction data. When the correction data is obtained, the position for the learning control start command is automatically restored, whereupon the machining is actually performed. As the machining is performed in the learning control interval from the start command to the end command, the position deviation is corrected based on the correction data obtained by the learning control. In any other intervals than the learning control interval, the position deviation is not corrected, and the normal position, velocity, and current loop processing is performed.

Thus, in the specified learning control interval, the correction data based on the learning control is automatically created by idling operations. When the correction data is obtained, it is automatically stored, and the position deviation is automatically corrected based on the obtained correction data as the machining is performed in the learning control interval. Since the aforesaid processing is automatically performed by executing one machining program, the cycle time can be shortened.

In resuming the same machining after thus performing the learning control to create and store the correction data into the memory of the numerical controller 1, the control device 1 reads out and stores the correction data into the learning memory means 22 of the learning control means and sets the correction data completion flag and the update stop flag to 1. As the machining program is then run, the processor of the numerical controller 1 sets the learning control flag to 1 (Step a6) if the learning control start command is read in Step a2. Since the correction data is stored in the learning memory means, it is concluded that the learning control start command is not a first command, whereupon the procedure proceeds from Step a7 to Step a9. Since the learning control flag is set at 1, the procedure proceeds to Step a3. It is concluded in Step a4 that the learning control flag is 1, and it is concluded in Step a17 that the update stop flag is 1. Accordingly, only the output of the learning control means 2 is turned on, and the correction of the position deviation based on the correction data is executed.

Thereafter, the processes of Step a0 to a4, Step a17, a19 and a5 are executed until the learning control end command is read. If the learning control end command is read, the processes of Steps a3, a11, a16, a4 and a5 are performed. Thereupon, the correction of the position deviation based on the correction data obtained by the learning control is stopped as the machining is performed.

According to the first embodiment described above, the number of repetitions of the learning control interval is used as a criterion for the decision on the acquisition of correction data such that the position deviation is converged close to zero by the learning control. According to a second embodiment described below, the magnitude of the position deviation is used to determine whether or not correction data such that the position deviation is converged close to zero is obtained.

FIG. 4 is a flowchart showing learning control management processing according to the second embodiment.

As seen from the comparison between FIGS. 3 and 4, Steps b0 to b19 of FIG. 4 correspond to Steps a0 to a 19, respectively. The second embodiment differs from the first embodiment in the details of Steps b6, b8, b15 and b12. Step b6 additionally includes processing for setting an error range flag to 0. Step b8 does not include processing for setting the repetition counter to 1. Step b15 does not include processing for adding 1 to the repetition counter value. In Step b12, whether or not the creation of the correction data is completed is determined based not on the repetition counter value but on whether or not the error range flag is 1. Further, the second embodiment differs from the first embodiment in that the program additionally includes Steps b20 and b21. In Step b20, whether or not correction data such that the position deviation is converged close to zero is obtained is determined depending on whether or not the position deviation is within a set range between upper and lower limits during the learning control. In Step b21, the error range flag is set to 1 if the position deviation is outside the set range.

The processor of the numerical controller 1 reads out and executes the machining program. If a read block contains the learning control start command, the procedure proceeds from Step b2 to Step b6, whereupon the processes of Steps b6 to b10 are performed. Since these processes are identical with the processes of Steps a6 to a10 described in connection with the first embodiment, a description thereof is omitted. However, differences lie in that the error range flag is set to 0 in Step b6 and that the correction data completion flag is only set to 0 without setting the repetition counter to 1 in Step b8.

If the learning control start command is read, the learning control flag is set to 1 in Step b6. After the processes of Steps b0 to b4 are executed, therefore, the procedure proceeds to Step b17 until the learning control end command is read. Since the update stop flag is initially 0, the procedure proceeds to Step b18, in which the learning control by the learning control means 2 is performed with the input and output on. Then, the position deviation is read out and it is determined whether or not the position deviation is within the set range between the upper and lower limits (Step b20). If the position deviation is not converged to the set range, the error range flag is set to 1 (Step b21), whereupon the procedure proceeds to Step b5. If the position deviation is within the set range, the procedure proceeds to Step b5 without setting the error range flag to 1.

If the learning control end command is read, the procedure proceeds from Step b3 to Steps b11 and b12. In Step b12, it is determined whether or not the error range flag is 1. If this flag is concluded to be 1, the execution pointer is returned to the position of the block for the learning control start command (Step b15), whereupon the processes of Step b16 and subsequent steps are performed. In consequence, the block for the learning control start command is read in the next period, so that the processes of Steps b6 to b10 are performed. The processes of Steps b4, b17, b18 and b20 are performed until the learning control end command is read. If the position deviation is not converged within the set range, the error range flag is set to 1 (Step b21).

In consequence, unless the position deviation is converged within the set range and as long as the error range flag is 1, an idling operation to execute the program without the interference between the tool and the workpiece is repeatedly executed and the learning control is performed to create the correction data in the learning interval from the learning start position to the learning end position. If the position deviation is converged within the set range between the upper and lower limits without being deviated from it at all in the learning interval from the learning control start command to the learning control end command, the error range flag cannot be set to 1, so that the learning control end command is read. Thereupon, the procedure proceeds from Step b3 to Steps b11 and b12. Since the error range flag is concluded to be 0 in Step b12, the update stop flag is set to 1, the correction data stored in the learning memory means of the learning control means is loaded into the memory of the numerical controller 1 (Step b13), and the correction data completion flag is set to 1. The tool and the workpiece are moved so that they interfere with each other, the idling operation is stopped to allow actual machining (Step b14), and the execution pointer is returned to the position of the block of the learning control start command (Step b15).

Thus, the block for the learning control start command is read in the next period. Since the correction data completion flag and the update stop flag are set to 1, the procedure proceeds to Steps b0, b1, b2, b6, b7, b9, b3, b4, b17 and b19 in the order named. In Step b19, the output-on command is outputted to the learning control means 2. Since the input is kept off, the learning control means 2 executes correction by adding the correction data to the position deviation as it performs position, velocity, and current loop processing, whereby the workpiece is actually machined.

Also in this second embodiment, the correction data is updated while the learning control is repeatedly executed by idling operations in the learning control interval until the position deviation is converged within the set range between the upper and lower limits in the learning control interval. If the position deviation is converged within the set range, the then correction data is stored in the numerical controller 1, and the position deviation is automatically corrected by using this correction data as the actual machining is performed.

If the correction data created and stored in the numerical controller 1 is used in resuming the same machining, also in this second embodiment, the numerical controller 1 reads out and stores the correction data into the learning memory means 22 of the learning control means 2 and sets the correction data completion flag and the update stop flag to 1. As the machining program is then run, the processor of the numerical controller 1 sets the learning control flag and the error range flag to 1 and 0, respectively (Step b6), if the learning control start command is read in Step b2. Since the correction data is stored in the learning memory means, it is concluded that the learning control start command is not a first command, whereupon the procedure proceeds from Step b7 to Step b9. Since the correction data completion flag is set at 1, moreover, the procedure proceeds to Step b3. It is concluded in Step b4 that the learning control flag is 1, and it is concluded in Step b17 that the update stop flag is 1. Accordingly, only the output of the learning control means 2 is turned on (Step b19), and the correction of the position deviation based on the correction data is executed.

In the second embodiment described above, it is determined in Step b20 whether or not the position deviation is within the set range between the upper and lower limits. Alternatively, however, it may be determined whether the position deviation is not smaller than a set specified value. In this case, the error range flag is set to 1 if the specified value is exceeded.

What is claimed is:

1. A numerical controller for controlling a servomotor for driving a machine according to a machining program, having a function of learning control to obtain correction data based on position deviations during repetition of execution of the same operation pattern and correct position deviations in execution of the same operation pattern based on the obtained correction data, said numerical controller comprising:

means for moving a tool relative to a workpiece from a position commanded by the machining program to a shifted position where the tool and the workpiece do not interfere with each other;

means for obtaining the correction data by automatically repeating the same operation pattern at the shifted position a set number of times, or until the position deviation is reduced to a set value or less;

means for automatically storing the obtained correction data; and means for moving the tool relative to the workpiece from the shifted position to the commanded position, and controlling the servomotor to perform machining by correcting the position deviations in execution of the same operation pattern based on the obtained correction data.

2. A numerical controller according to claim 1, wherein the correction data are obtained and stored, and the machining is performed by correcting the position deviations in execution of the same operation pattern based on the correction data, in one execution of the machining program.

* * * * *